United States Patent
Nelson et al.

(10) Patent No.: US 6,782,381 B2
(45) Date of Patent: Aug. 24, 2004

(54) METHOD AND APPARATUS FOR EVALUATING QUERIES AGAINST RECEIVED EVENT INFORMATION

(75) Inventors: Giles John Nelson, Bourn (GB); John Bates, Cambs (GB)

(73) Assignee: Apama (UK) Ltd. (GB)

( * ) Notice: Subject to any disclaimer, the term of this patent is extended or adjusted under 35 U.S.C. 154(b) by 216 days.

(21) Appl. No.: 09/735,706

(22) Filed: Dec. 12, 2000

(65) Prior Publication Data

US 2002/0128897 A1 Sep. 12, 2002

(30) Foreign Application Priority Data

Apr. 17, 2000 (GB) .............................................. 0009487

(51) Int. Cl.[7] .............................................. G06F 17/30
(52) U.S. Cl. ........................................................ 707/3
(58) Field of Search .......................... 707/3, 10, 104.1, 707/103 R; 709/318; 701/29; 340/439

(56) References Cited

U.S. PATENT DOCUMENTS

| | | | | |
|---|---|---|---|---|
| 5,864,840 A | * | 1/1999 | Leung et al. ................... | 707/2 |
| 5,917,408 A | * | 6/1999 | Cardillo et al. ............. | 340/439 |
| 5,974,406 A | | 10/1999 | Bisdikian et al. ............... | 707/1 |
| 6,351,747 B1 | * | 2/2002 | Urazov et al. ................ | 707/10 |
| 6,367,034 B1 | * | 4/2002 | Novik et al. .................. | 714/39 |
| 6,438,618 B1 | * | 8/2002 | Lortz et al. ................. | 709/318 |

FOREIGN PATENT DOCUMENTS

WO          WO97/10558          3/1997

OTHER PUBLICATIONS

International Search Report dated Oct. 2, 2002, (PCT/GB01/01745; AER/P24638 WO).

* cited by examiner

Primary Examiner—Diane D. Mizrahi
(74) Attorney, Agent, or Firm—Williams, Morgan & Amerson

(57) ABSTRACT

Queries are evaluated against received event information and notifications that events specified in the queries have occurred are generated by following the steps of recording the number of queries; receiving an item of event information; comparing the received item of event information with the queries; and generating a notification if the item of event information matches the query. Normally, a series of items of event information will be received and these are compared sequentially with the queries. Each query can be arbitrarily complex comprising a plurality of sub-queries, each requiring a different item or items of event information to be matched.

24 Claims, 10 Drawing Sheets

| Type | Elem_name |

Typed element with name
Elem_name

FIG. 3A

| Type | Elem_name |>

Reference to an element
of this type

FIG. 3B

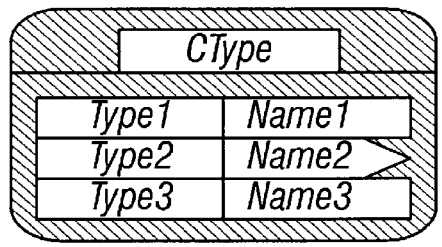

Collection type CType-a way
of binding together types as a
structure. Note: elements can be
references to other existing
elements (e.g. Name2).
Any of the elements making
up a structure of this kind
can be accessed by field name
at any time.

FIG. 3C

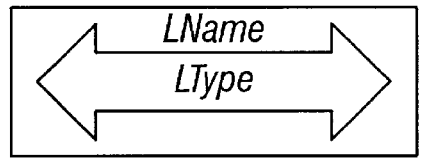

Lists of elements of type LType-
a way of collecting elements
of the same type. LName is
used to identify the element if
it is included in a collection type.
New list elements can be inserted
or removed at the beginning, the
end or between any two existing
elements in the list. The list
maintains the order of the elements
based on where they are inserted.
The list elements can be
accessed at any time.

FIG. 3D

METHOD AND APPARATUS FOR EVALUATING QUERIES AGAINST RECEIVED EVENT INFORMATION

BACKGROUND OF THE INVENTION

We hereby claim under 35 U.S.C. §119(a)–(d) priority to the application GB 0009487.0 filed in Great Britain on Apr. 17, 2000.

1. Field of the Invention

The present invention pertains to generating notifications of events and, more particularly, to a method and apparatus for evaluating queries against received event information.

2. Description of the Related Art

There is a general demand for services which will notify a user when specified events occur. One specific commercial demand for such services is in relation to the stock market, where it is possible to make significant profits by responding to events quicker than other players in the market even where there is general agreement as to the best action to be taken.

In the past, automated systems have been proposed to allow users to identify particular events of interest. The system is then provided with relevant data regarding events taking place in real time. When the events with which the system has been provided are identified as matching the criteria set by users, the users are notified that this has occurred.

Such automated systems have operated in the past by taking conventional database management systems and employing them to generate event notifications.

Database management systems have been employed because they are designed to store and sort through large quantities of data. The way these systems operate is that when a query is received from a user, the database management system sorts through the database to see whether the query can be answered by the stored data. In the past, it has been proposed to apply such a database management system to automatic notification generation by storing the received event information in a database and searching the database for each of the queries. When the search through the database identifies event information matching a query, a notification is generated.

There are a number of problems with this approach which arise because the data held in the database changes continuously as events are received. Firstly, because the data held in the database is continually and unpredictably changing, it is necessary to repeatedly search through the database for each query until the query is resolved. The repeated searching through the database for each query is very demanding of system resources. As a result, as the database of events and the number of queries for which notifications may be required increases, it becomes increasingly difficult to ensure that notifications are sent out quickly.

Also, all of the received event information must be stored in the database before it can be sorted through, making further demands on system resources.

Further, conventional database systems are not an effective method of resolving time based or temporal queries. That is, a conventional database system can answer a query whether two or more events have occurred but cannot easily answer a query whether two or more events have occurred in a specific sequence or within a time frame. Although the time based information required to allow such temporal queries to be answered can be stored in a database, it must be stored for all events because the content of registered queries is not known when the events are stored in the database. This requirement to store time data for all events stored in the database further increases the size of the database and the time and system resources required to make searches.

Finally, because events may be the subject of time based queries, all events stored in the database must be retained for a sufficient time to allow all time based queries to expire. This period cannot be predetermined before queries are made, so it is necessary to either set an arbitrary limit on how long data will be held in the database or store all data indefinitely so that a very large amount of redundant data must be retained in and checked by the database. Clearly, both of these alternatives are undesirable.

The present invention is directed to resolving, or at least reducing, one or all of the problems mentioned above.

SUMMARY OF THE INVENTION

The present invention provides, in one particular aspect, a method of evaluating queries against received event information and generating notification that events specified in the queries have occurred comprising the following steps: recording a number of queries; receiving an item of event information; comparing the received item of event information with the queries; and generating a notification if the item of event information matches the query.

BRIEF DESCRIPTION OF THE DRAWINGS

Embodiments of the invention will now be described by way of example only with reference to the accompanying diagrammatic figures, in which:

FIGS. 3a to 3d show notations used to define data structures in the subsequent figures;

FIG. 10b shows a data structure used to represent a variable in the data structure of FIG. 10a;

FIG. 11 shows a data structure representing a query state forming a part of the data structure of FIG. 10a;

FIG. 13 shows a data structure representing variables forming a part of the data structure of FIG. 10a;

Figure 1:
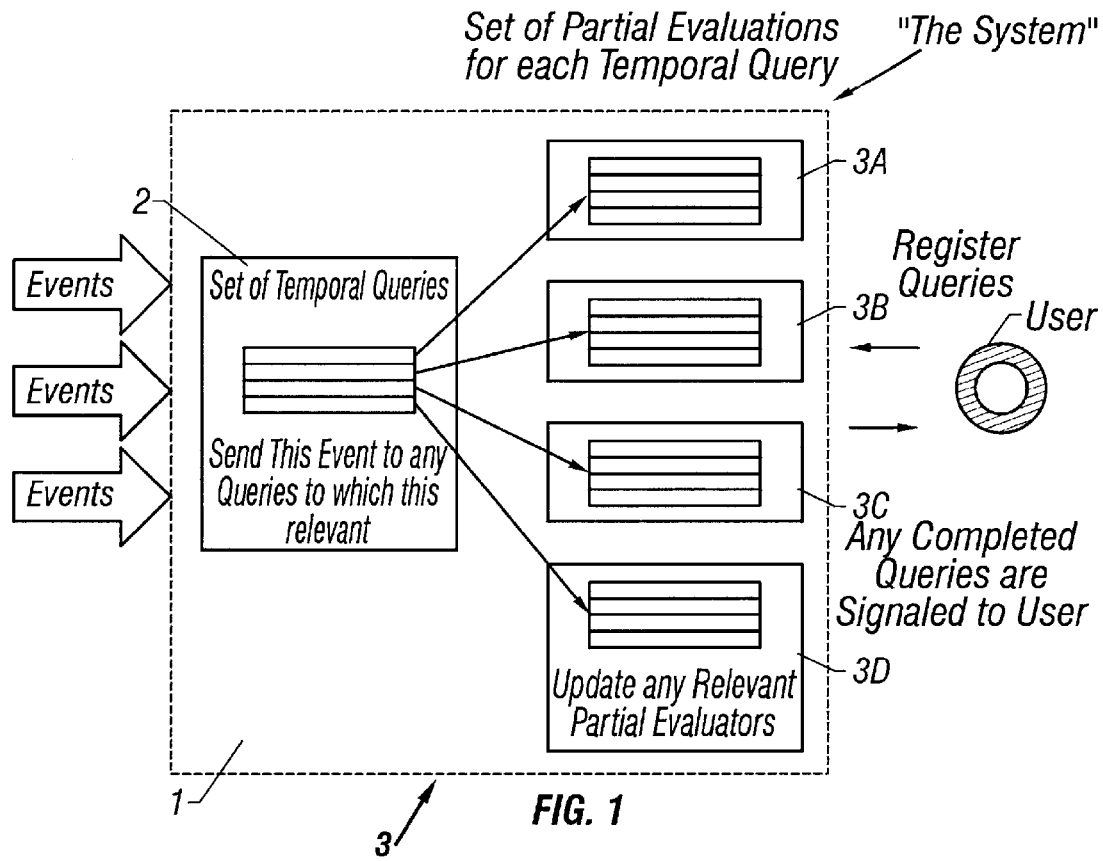
FIG. 1 shows the general structure of a system employed in the invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Referring to FIG. 1, the general operation of the system according to the invention is shown diagrammatically.

The query registration and notification system 1 is supplied with queries by users and monitors information about events which have occurred. When events occur which match a query, a notification that the query has been completed is signalled to the appropriate user.

In the system according to the present invention, the queries sent by users are registered and recorded as a set of queries 2. When the occurrence of events is reported to the system 1, the events are examined to see which, if any, of the queries held in the set of queries 2 to which the event is relevant.

If any event is relevant to one of the queries in the set of queries 2, the event may allow a simple query to be immediately evaluated and completed. In this case, a notification that the query has been evaluated is signalled to the user.

A query can comprise a number of parts, each of which can be an event or a query, such queries forming parts of other queries are termed sub-queries herein.

For more complex queries, multiple events may be required to allow a query to be evaluated, and where this occurs the partially evaluated query is held in a set of partial evaluations 3 to await complete evaluation of the query.

Each of the queries may have a number of partial evaluations awaiting final evaluation. The set of partial evaluations 3 for each query is held in a separate list 3a, 3b, 3c, 3d, etc. These partial evaluations awaiting resolution are referred to as partial evaluations threads herein.

When events are notified to the system 1, as well as the event being examined to determine which of the queries held in the set of queries 2 to which the event is relevant, the event is also examined to determine which of the partial evaluation threads held in the sets of partial evaluations 3 for each query to which the event is relevant.

If the event allows the partial evaluation thread to be resolved, again the user is notified that the entire query has been resolved. Alternatively, if the event only allows a further partial evaluation of the query, the partial evaluation threads themselves generate further partial evaluation threads corresponding to the new partially resolved status of the query.

In principle, the queries registered by the users may be of arbitrary complexity requiring an arbitrary number of events to be resolved so that the number of partial evaluation threads derived from each registered query may be arbitrarily large.

A query may be a temporal query having a time based element which can be a requirement that an event or events take place by a set time, or that events take place in a particular sequence or within a set time of another event or events or both. Prior art database based systems have particular difficulties with handling such temporal queries as explained above.

Note that when a query is partially resolved by the received event so that a partial evaluation thread is generated the original query remains in the set of queries 2 allowing further partial evaluation threads to be generated from the original query if necessitated by further received events. The same applies to the partial evaluation threads themselves, so that each partial evaluation thread can produce a further generation of partial evaluation threads while itself continuing to persist as a partial evaluation thread.

When it is decided that received events match the criteria set by the query, the query is regarded as having been matched. It should be noted that the criteria set by the query may be that events specify variables or values falling within particular ranges or having a particular relationship so that matching of queries by received event information should not be regarded as requiring that variables in the event information are actually equal to variable values set in the query.

A simple example of this arrangement for a temporal query would be if a user registered a query instructing that they be notified if the event B followed the event A within a specified period. This query would be passed to the system 1 and placed in the set of queries 2. When event A was reported to the system 1, this query would produce a partial evaluation thread that A had occurred and that the occurrence of B is awaited by a specified time. In the event that event A is reported as occurring multiple times, each occurrence would generate a separate partial evaluation thread awaiting the occurrence of event B by a different time. When the event B is reported to the system 1 within the set time limit after reporting of an event A, the appropriate one of the partial evaluation threads will generate a notification that the temporal query has been evaluated.

It is possible that such an arrangement could result in a plurality of the partial evaluation threads derived from a single registered temporal query being fully evaluated by the same event, in this case reporting of event B within the specified period of multiple reports of event A. The same problem could arise for both temporal and non-temporal queries if queries including OR statements are supported by the system. When this occurs, the system 1 may send multiple notifications or only a single notification as desired. The issue of single or multiple notifications may be set by the system 1 or may be an option set by the user.

Where only a single notification is sent, it will normally be most useful for temporal queries to send notification of the first full evaluation, in the example the earliest occurrence of A followed by B within the specified time, but other criteria could be used to decide this. This could be a pre-set parameter of the system or an option which can be set by the user.

The system 1 may be arranged to delete queries and all of the partial evaluation threads they have generated immediately one of the partial evaluation threads is successfully evaluated and a notification sent so that the user is notified only the first time the query is successively evaluated. Alternatively, the query and its partial evaluation threads may be left in place so that the system notifies the user each time the query is successfully evaluated until the user instructs that the query be de-registered.

It will be understood that the above process of partial evaluation thread generation can be repeated as necessary for more complex queries.

In principle, any event can be made the subject of queries to be registered in the system so that the field of queries for which notifications can be generated is in principle unlimited. However, in practice it will normally be necessary for a system to be limited to queries in a particular defined field or fields can be supplied to the system to allow the queries to be accurately evaluated.

The key difference between the system according to the invention and previously known systems is that in the system according to the invention, the registered queries are stored and are operated on by received events to see whether the events are relevant to the queries. This is the reverse approach to known database based systems where the received events are stored and are then operated on with the queries to see if the queries are relevant to the events.

Accordingly, the system according to the present invention is optimized to deal with queries about future events in contrast to a conventional database based system which is optimized to deal with questions about past events.

This different approach allows a system according to the invention to operate much more efficiently and effectively than prior art database management system based approaches and allows the problems encountered in such prior art database management system based approaches to be overcome.

Firstly, it is only necessary to operate on the stored queries once with each item of received event information. As a result, the repeated searching through a database of events for each query which is necessary in the prior art is unnecessary so that the system resources required are greatly reduced. As a result, it is much easier to ensure that notifications of answered queries are sent out quickly.

Also, there is no requirement to store received event information once it has been checked against the stored queries and appropriate notification of resolved or answered queries generated. This greatly reduces the amount of information which must be stored because it is only necessary to store unresolved queries whereas in prior art database based systems, it is necessary to store both the unresolved queries and the received event information. Further, it will almost always be the case in practice in a prior art database based system that the cumulative amount of event information stored will be much greater than the amount of registered queries. Accordingly, the reduction in information storage requirements in practical systems will be very large. Also, because the demand in terms of system resources of checking information against stored information is dependent on the amount of stored information, the time taken to check each received event against the registered queries in a system according to the invention will in practice be less than checking a query against the stored event information in a prior art database based system.

Further, the system according to the invention is far more efficient for dealing with time based queries than the prior art database based systems because resolution of time based queries in the present invention only requires the ability to retain time limited partial evaluation threads until their set time periods expire whereas prior art database systems require that all events together with appropriate time information be retained indefinitely.

In order for a user to register a query, the user must specify what event or events the system 1 should look for and how the user should be contacted when the query has been satisfied. Optionally, where appropriate, the user should define the time period over which the system should look for events.

As explained above, it is essential that the method by which the user is to be notified that a query has been completed or resolved is defined. However, in many applications, a preferred method of notification can be assumed to be used as a default method of notification in the absence of specific instructions from the user to use a different method of notification.

For simplicity, in the examples it will be assumed that all notifications are sent by e-mail to a user defined e-mail address in order to allow other aspects of the invention to be clearly understood. However, it should be understood that any other method of notification could be used if desired.

Users send queries, which may be temporal queries to the system and the queries are registered within the system 1. As events are notified to the system, the events are used to evaluate the queries. When the received events satisfy the requirements of a query, one or more notifications regarding the completed query are sent to the relevant users.

In order to allow queries to be evaluated, it is necessary that the queries define the events and event-related parameters in a manner compatible with the format in which events are notified to a system. Clearly, it is not possible for a query to be meaningfully evaluated if it relates to events of a type not reported to the system or specifies event parameters which are not supplied to the system. Accordingly, although as noted above the structure of the queries may be arbitrarily complex it is essential that the content of the queries relates only to events and event-related parameters which are provided to and so supported by the system.

In order to allow this, the parameters which may be associated with each event must be defined so that queries based on these parameters can be registered and evaluated.

It will normally be advantageous to sort events into a number of defined classes with the parameters associated with each class being defined. For example, the event class stock price could be defined as the event of a change in a stock price and the associated parameters would be the identity of the stock and the new stock price.

It will be appreciated that the possible parameters and the types of parameters making up an event will vary depending upon the type of event. By defining similar events as being part of an event class, the event class can be used to define the relevant parameters and their forms so that only the relevant parameters need to be set out in the information defining the event. The parameters defined for an event are typically of the types string, integer, real and date but the parameters could also be defined using any other types of data if desired.

In a system notifying users of events significant for stock prices, a typical class of event would be the latest stock price of a particular stock, and the event could be coded as stockprice (symbol string, price flow) where "stockprice" defines the class of event, the symbol string is the stock or company name, and the price flow is figures giving the current stock value, for example:

StockPrice ('Big Co', 90.56) would report that the price of Big Co's stock had just changed to 90.56.

Alternatively, the latest stock price of a particular stock could be coded as stock price (symbol string, price flow, date) where "stockprice" defines the class of event, the symbol string is the stock or company name, the price flow is figures giving the current stock value, and the date gives the time at which the change occurred.

In both cases, the stock or company name parameter is string type data and the price flow parameter is real data. In the second example the date parameter is date type data.

Similarly, when a user registers a query, the query must specify to the system the event types and events which the system should look for and optionally what time period they should be looked for over together with the method by which user is to be notified if the query is satisfied.

Thus, a query consists of a specification of which event or events to look for and may set a time interval between different ones of these events and/or a time limit for the query. If no time limit is set, the query may simply be continued until it is satisfied or de-registered and one of these options will normally be the default setting for the system. Where queries refer to more than one event, they may define the temporal order of the events and/or the time interval.

Queries can be as complex as required. One simple example of a temporal query would be a query such as:

eg1→StockPrice ('BAY', price)→
NewsItem ('BAY', headline)<20.0 this query is named eg1 and would tell the system to look for an event of the type stockprice, that is a stock price change, for the company BAY and after this event has been received, to look for an event of the type newsitem, that is a news item, referring to the company BAY in the headline, the newsitem being received within twenty seconds of the stockprice event being received. If all of these conditions apply, the query will be satisfied and the user notified.

This example shows one event following another event as the query. This example could itself be used as part of a sub-query of another query. There is no limit on the complexity of the queries and due to the arrangement of the inventive system, even highly complex queries can be efficiently and quickly resolved.

In this example, the query eg1 is looking for a specified stockprice event followed by a specified newsitem event in which the notification of these events to the system occurs within a set time interval.

Using the times at which are events notified to the system as a basis for temporal queries is a simpler option than using the times at which the events actually occurred. This is because it is then not necessary to include any information regarding the time at which the event occurred in the event notification. In systems dealing with some types of events, it may be desirable for users registering queries to base their queries on the actual time at which events occurred rather than the time at which the events were reported to the system. In general, the significance of the actual time of occurrence of an event as opposed to the time of reporting will become greater as the normal length of time required for an event to be reported after occurrence and the variability in this reporting time increases.

However, in many cases, such as stock prices, the time taken for information to be received by the system after the events occur will be very short and have little variability. For example, stock prices are reported from exchanges very quickly after they occur and are then disseminated effectively instantaneously by electronic media. Further, in this specific field, it is expected that the increasing use of computerized share dealing systems to operate the exchanges will result in changes in shareprice being disseminated effectively instantaneously as they occur.

The above stockprice examples assume that the stockprice event is a change in price at a specified stock exchange, and that the price information is always given in the same currency. In some systems, this will be sufficient, but in practice it will often be desirable to either have a number of event classes corresponding to stock prices at different exchanges so that stockprice events in those classes are always at those exchanges and give prices consistently in the relevant local currency. Alternatively, the parameters associated with each stockprice event could be expanded to identify the exchange at which the stockprice change has occurred. If necessary, a further parameter identifying the currency used could be included, but normally it is expected that all stockprice changes at a specific exchange will be given consistently in a single currency.

An additional reason for basing temporal queries on the time at which events are reported to the system rather than the time which the events occurred, for some types of query, is that many existing information sources which could be used to provide event notification to a system do not identify the time at which events occurred. Again, an example is stockprice data feeds which normally report changes in stockprice as a series of stock price change events one after another but provide only information identifying the stock and its new price. Of course, in this case, the exchange at which the stockprice change has occurred is implied by the source.

A similar situation exists in many other fields of information where existing information sources provide information regarding changes or other events as soon as possible and as close to real time as possible, but do not identify when the events reported actually took place.

Clearly, where data sources of this type are to be used to provide the event data to the system, temporal queries will have to be based upon the time of reporting events to the system because information regarding the time at which the events actually occurred is not available.

A selection of the main options for composing queries includes, but is not limited to, the following:

One event or sub-query following another,

An event or sub-query following another with correlation in the parameters of the two events or sub-queries, An event or sub-query following another without specified intervening events, An event or sub-query or another event or sub-query occurring, An event or sub-query occurring within a specified time window, An event or sub-query not occurring within a specified time window.

A more complex example of a query would be:

eg2→StockPrice (Name, Price)→
StockPrice (Name, Price+>5%)<600.0

This query is named eg2 and would look for an event of the class stockprice reporting a change in the price of any stock to any value and would capture the relevant name and stock price. If this stockprice event was followed by another stockprice event for the same stock name in which the share price had risen by more than 5%, within six hundred seconds (ten minutes), the query would be satisfied and the user notified.

A further example of a more complex query would be:

eg3→StockPrice(Name, Price)→Newsitem (Name, Headline)<300.0

This query is named eg3 and would look for an event of the class stockprice reporting a change in the price of any stock to any value and would capture the relevant stock name. If this stockprice was followed by a news event referring to the same stock name in the headline within three hundred seconds (five minutes), the query would be satisfied and the user notified.

As shown by the above examples, the parameter values employed by later parts of a query can be based upon parameters identified and captured in earlier parts of the query.

Another factor which must be defined in composing a query is whether or not the items in the query can give rise to multiple partially resolved queries or evaluation threads. In the above examples, an arrow is used to identify events which are to be looked for after other events have occurred.

It will be understood that a query comprising only a single item which is fulfilled by notification of a single event cannot give rise to multiple partial evaluations because it will automatically always be entirely fulfilled if the relevant event occurs.

Where queries include multiple sub-queries, it is necessary to identify whether the sub-queries are able to give rise to multiple partial evaluations or evaluation threads or not. Those sub-queries which are able to give rise to multiple evaluation threads are identified as spawning and those that are not are identified as non-spawning.

An example of a query identifying spawning and non-spawning sub-queries is shown below:

eg4=>StockPrice ('BAY', Price)→Newsitem ('BAY', Headline)<20.0

This query is named eg4 and is similar to previous example eg1. The notation of a single arrow to identify a non-spawning sub-query and a double arrow to identify a spawning sub-query has been employed.

The first sub-query of query eg4 is spawning because each occurrence of a stockprice event showing a change in the stock BAY will generate a separate evaluation thread or partial evaluation awaiting reporting of a newsitem event within 20 seconds. However, the second sub-query of identification of the newsitem identifying BAY in the headline within 20 seconds is non-spawning, because of an event fulfilling this sub-query will allow evaluation of the entire query.

It should be realized that the identification of a sub-query as spawning or non-spawning is under the control of the user specifying the query and the effect of specifying different sub-queries in a query as being spawning or non-spawning can be significant.

For example, consider the queries below:

eg5=>StockPrice (Name, Price)→Newsitem (Name, Headline)<20.0 eg6→StockPrice (Name, Price)=>Newsitem (Name, Headline)<20.0

The queries eg5 and eg6 employ the same sub-queries as example eg3 given above.

In the query eg5, the first sub-query, the stockprice change, is spawning while the second sub-query regarding the subsequent news item event is non-spawning. In the query eg6, this is reversed so that the first sub-query regarding the stock price event is non-spawning while the second query regarding the newsitem event is spawning.

Using query eg5, each time a stockprice event is received, a new partial evaluation thread will be set up awaiting receipt of a news item identifying the stock named in the stockprice event in its headline. Because the stockprice event sub-query is spawning, this sub-query will remain in place generating a new partial evaluation thread awaiting notification of a newsitem identifying the stock name from the new stock price event. When a newsitem matching any of the partial evaluation threads for different stock names is received, the query is resolved because the newsitem sub-query is non-spawning and the entire query including any unresolved partial evaluation threads will be removed.

The results of query eg6 are very different. Using query eg6, once a stock price event is received, a single partial evaluation thread will be created looking for a newsitem, identifying the stock name from the stockprice event in the headline. Because the stockprice sub-query is non-spawning, only a single partial evaluation thread will be generated based on the first stockprice event received. Subsequently, when a newsitem event identifying the stock name in its headline is received, this partial evaluation thread will be resolved. However, because the newsitem sub-query is identified as spawning when the newsitem is received, a new partial evaluation thread will be created and immediately completed and evaluated. The newsitem sub-query is spawning so the original partial evaluation thread awaiting receipt of the newsitem event will not be deleted and the query as a whole will not be regarded as resolved. Accordingly, the query eg6 will result in notification of all subsequent newsitems regarding the stock name identified in the stockprice event.

As has been illustrated by these examples, the identification of a sub-query of a query as being spawning or non-spawning is not a simple matter of logical analysis of the sub-queries making up the query but is set by the user depending upon the information the query is intended to provide and can have considerable effect on the information provided. It will be understood from the above example comparing eg5 and eg6 that queries made up of identical sub-queries in the same order can produce very different information, depending upon which of the sub-queries are identified as spawning and which are not.

As has been noted above, a query comprising only a single sub-query which will be fully evaluated by receipt of a single event meeting the sub-query criteria does not need to be identified as spawning or non-spawning. In practice a user may wish to have a query retained on the system indefinitely or for a set time regardless of whether or not the query is evaluated. This can be carried out by providing some management or override function in the system identifying such queries as requiring immediate reinstatement in the system after they have been evaluated or requiring that these queries not be removed from the system when they are evaluated. A more elegant solution to this problem is to avoid removal of these queries by appropriate identification of the queries as being spawning so that the query cannot be completely resolved and subsequently deleted, for example, as discussed with reference to query eg6. This approach avoids the need for any dedicated management software to identify and retain queries which should not be deleted upon evaluation. In this case of a query comprising only a single query which will be fully evaluated by a single relevant event, removal of this query from the system on evaluation can be prevented simply by specifying it as a spawning query rather than a non-spawning query.

It will be understood from the above discussion that in order for the system to operate, it must not only register queries from users but must also maintain a record of partially fulfilled queries or partial evaluation threads to see whether the queries are completely fulfilled.

Figure 2:
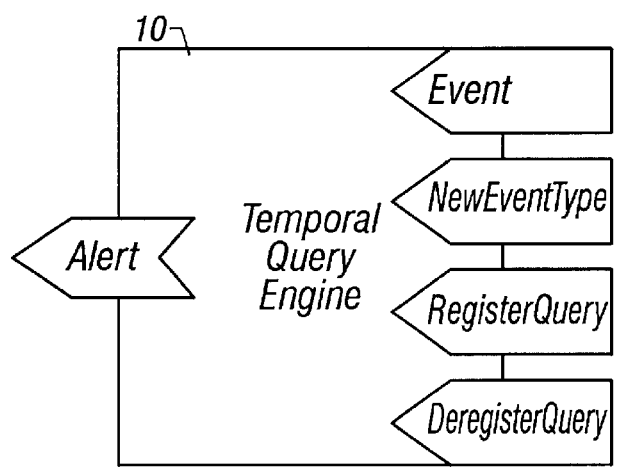
FIG. 2 is the explanatory diagram showing operation of the system of FIG. 1.

From the point of view of the user, the system appears as a temporal query engine 10 as shown in FIG. 2. The temporal query engine 10 receives inputs from users to register queries of interest and de-register queries that are no longer of interest and is supplied with event information regarding events which have occurred. The temporal query engine 10 compares the received event information with registered queries and generates notifications to users that registered queries have been fulfilled.

The operation of the temporal query engine 10 according to the invention is able to provide the desired service by storing the registered queries in data structures and manipulating the data structures according to algorithms as events are received in order to allow the desired notifications to be produced.

In order to allow the services provided by the temporal query engine 10 to be extended, if necessary, the temporal query engine 10 can have new event type definitions supplied to it to allow queries regarding new event types to be registered and fulfilled.

Dealing first with the required data structures, there are four main notations used herein to define the data structures and these are shown graphically in FIGS. 3a to 3d. These notations used to graphically show the data structures are used in the other figures.

The main class of first data structure is a typed element. A typed element is the inclusion of a data structure of a type already defined elsewhere. Basic types of data structures such as string, integer, real and date data will usually be defined with their normal attributes and other types of data may be defined as needed.

The notation used to represent typed elements is represented graphically in FIG. 3a.

The second main class of data structure are references. A reference data structure is a reference to a data structure defined elsewhere.

The notation used to represent a reference data structure is represented graphically in FIG. 3b.

The third main class of data structure is a collection type structure. The collection is type data structure aggregates several elements of different classes as a new class. The individual elements aggregated in the collection type data structure can themselves be different classes, for example, typed elements, references or lists and the new class of data structure formed by the collection of data structure can itself be a typed element, a reference or list.

FIG. 3c shows the notation used to represent a collection type data structure. As an example, CType is shown made up of three data structure elements, a typed element of type Type 1 with name Name 1, a reference to a typed element of the type Type 2 with name Name 2 and a typed element of type Type 3 with name Name 3. Any of the elements making up a collection type data structure can be accessed by name at any time.

The fourth main class of data structure is a list type structure. A list type date structure aggregates several elements of the same type.

FIG. 3d shows a graphical representation of the notation used to describe a list type data structure having a number of elements of type LType, the list type data structure having the name LName to allow it to be identified, for example, if it is included in a collection type data structure.

The list type data structure maintains the order of the elements placed in it and new elements can be inserted at any desired position in the list. The elements held in the list can be accessed at any time.

Figure 4:
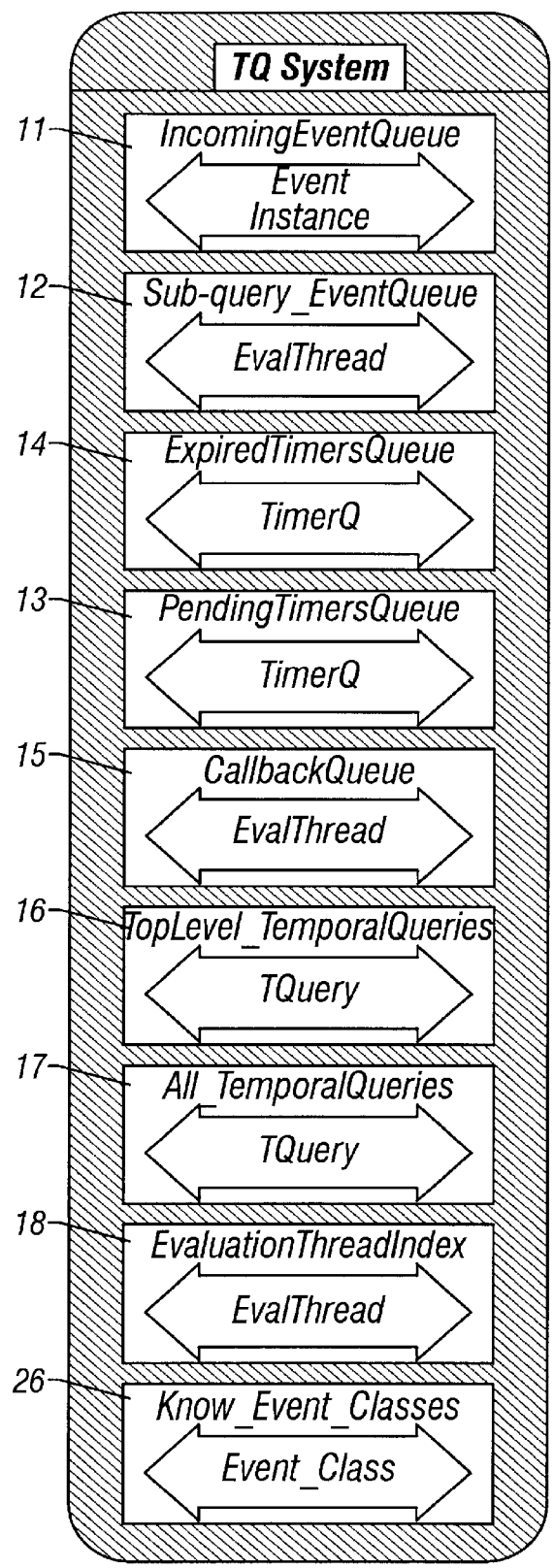
FIG. 4 shows an overall top level view of the data structure of a system according to the invention.

The overall top level view of the data structure of the temporal query engine 10 is illustrated in FIG. 4. This data structure can be viewed as comprising a plurality of event queues each of which is a list type data structure formed by a number of similar elements.

In order to allow the temporal query engine to receive events from event sources and receive queries for registration from clients and to report matches of events against registered queries to the clients, a number of queues are required. These can conveniently be provided by list type data structures.

Please note that the terms temporal query and temporal query engine used below refer to the possibility that some queries may include time based or temporal elements, and are not intended to imply that all the queries must include a time based element.

An incoming event queue 11 contains a list of events that have been received by the temporal query engine 10 but have not yet been checked for matches against registered queries. Receipt of event information from external sources is asynchronous with the internal operations of the temporal query engine 10 and the rate in which events will be reported to the temporal query engine 10 is variable and unpredictable. Accordingly, it is inevitable that information regarding new events will sometimes be received before previously received events have been processed for matches against registered queries, so a temporary storage queue for new events is necessary.

A sub-query event queue 12 is required because, as explained above, some queries are made up of a number of smaller components or sub-queries which need to be evaluated in parallel. The results of evaluating the sub-queries can be conveniently treated as events to be matched against the queries of which they are a part. The internally generated events resulting from matches of events to sub-queries are stored in the sub-query event queue 12.

Many queries are time dependent. In these queries, when an event matching a part of the query occurs, a timer is set and then at a later time after a specified interval the timer will expire. When timers are set, they are stored in a pending timers queue 13 until they expire. The pending times queue 13 can be examined by evaluation threads to determine whether an expired timer exists which is relevant to them.

When the timers held in the pending timers queue 13 expire, the expired timers are stored in an expired timers queue 14. The expired timers queue 14 can be examined by evaluation threads to determine whether an expired timer exists which is relevant to them.

When a set of events, which may be one event or a plurality of events, occurs which matches a registered query, the relevant client must be notified. This is carried out by placing a call-back entry in a call-back queue 15 whenever a set of events occurs which matches a registered query. The temporal query engine 10 sends out notifications to clients in response to the call-back instructions in the call-back queue 15. Again, the rate at which queries are matched is variable and unpredictable, so some means to store notifications not yet completed is essential.

The actual queries registered by clients, but not their component sub-queries are held in a top level temporal query list 16. Use of the top level temporal query list 16 allows fast access to the actual registered queries, so enabling the de-registering of queries which are no longer of interest to be quickly carried out. The queries held in the top level temporal query queue 16 are of course the only queries that cause entries to be made in the call-back queue 15 and notifications to be issued when they are matched by received events.

As explained above, actual temporal queries registered by clients will often comprise a plurality of sub-queries and these sub-queries are themselves temporal queries in their own right. All of the temporal queries, that is, both the actual queries registered by clients and the sub-queries forming parts of these actual queries are held in an all temporal queries queue 17.

An evaluation thread index list 18 holds a list of the names of all of the event classes that the temporal queries currently held in the temporal queries queue 17 are looking for. Reference to the evaluation thread index instead of individually checking all of the temporal queries allows received events to be quickly identified as being of interest, and so requiring further action, or not. This allows faster processing of incoming events to be carried out and so enhances system performance.

A known event classes list 26 holds a list of all of the event classes being notified to and able to be processed by the system. Only event classes held in known event classes list 26 can be used in queries, and queries containing events not in this list are not accepted for registration. The known event classes list 26 is a static list which is not altered by the system in operation. However, the contents of the known event classes list 26 can be amended by the system operator as required to offer the desired services.

Figure 5:
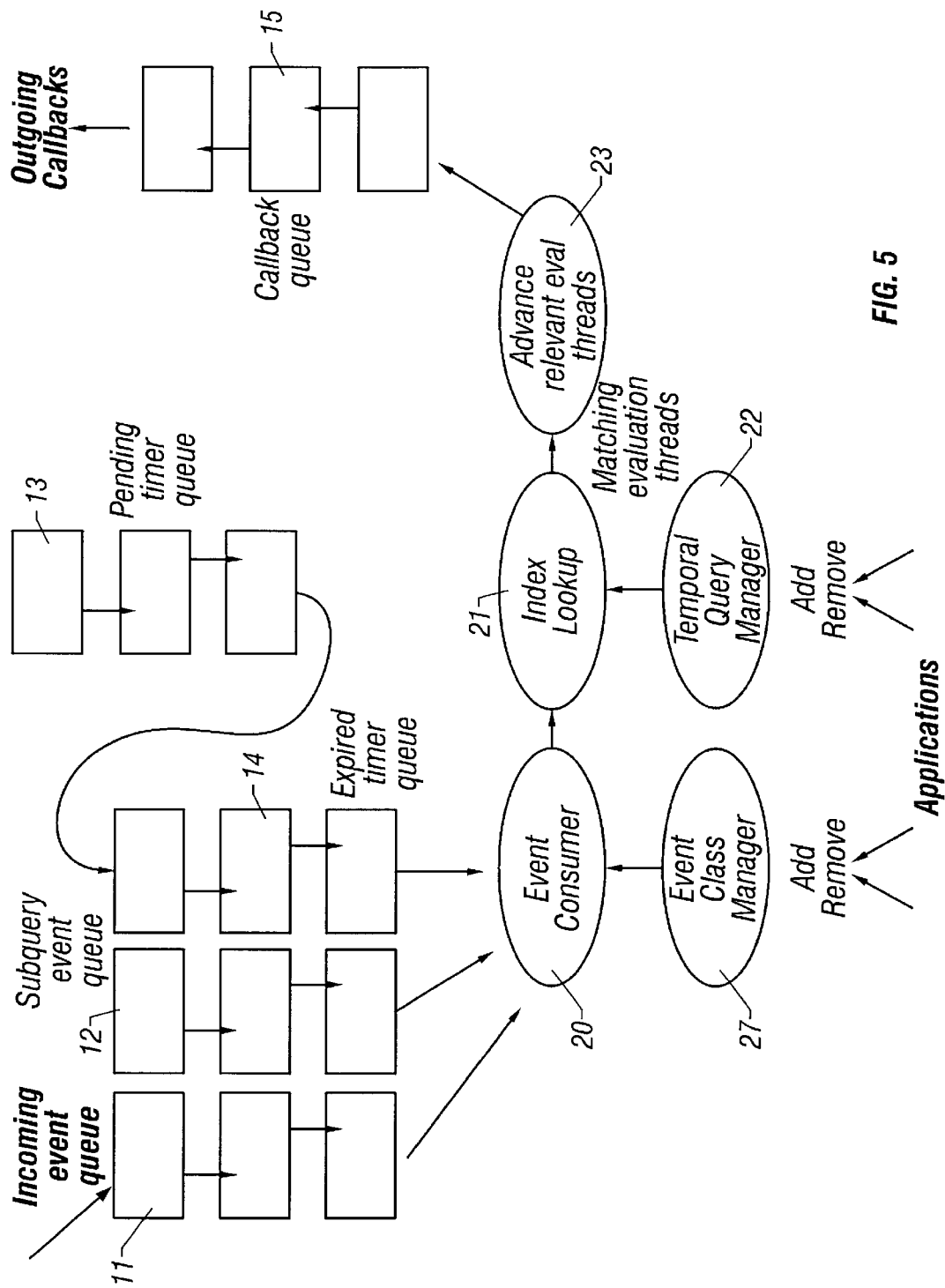
FIG. 5 is an explanatory diagram showing the method of operation of the invention.
Figure 6:
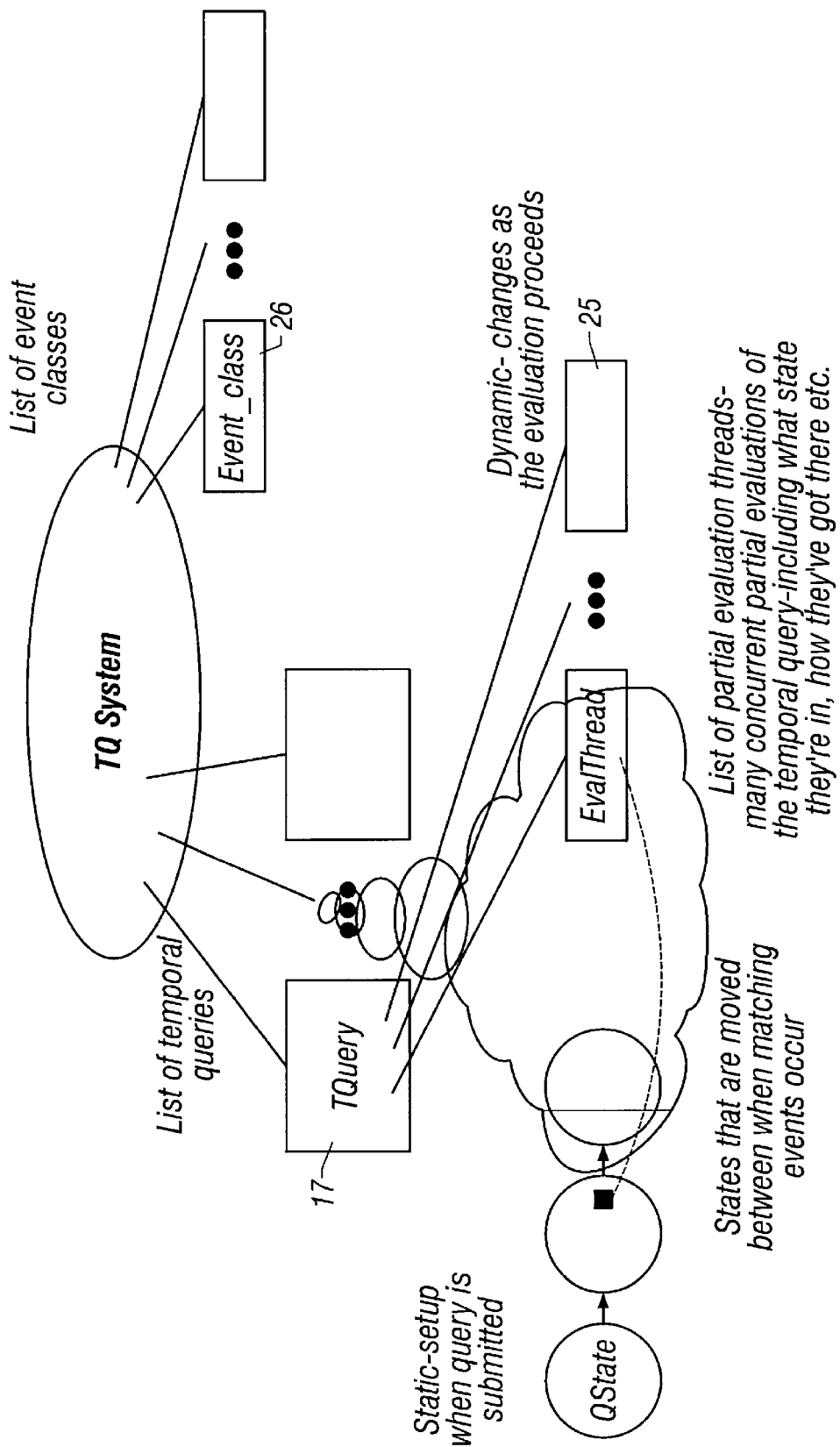
FIG. 6 is a further explanatory diagram showing the operation of the method of FIG. 5.

The way in which the top level data structure shown in FIG. 4 is employed to carry out the functions of the temporal query engine 10 is shown in FIG. 5 which shows the ways in which data passes through the system and FIG. 6 which shows the hierarchy of the data structures.

The operation of the temporal query engine 10 will now be described with reference to FIGS. 5 and 6. The incoming events from the incoming event queue 11, internal events produced by evaluation of sub-queries held in the sub-query event queue 12 and expired timer events held in expired timer queue 14 are all passed to an event consumer device 20 which identifies the class and appropriate method of dealing with the events and sends the events in turn to an index look-up means 21.

An event class manager 27 is used to add or remove event classes which the event consumer device 20 is able to handle. Events and queries relating to event classes not identified by the event consumer device 20 will not be processed.

A temporal query manager 22 is provided with instructions to register or de-register queries by users. The temporal query manager 22 determines which new queries, sub-queries and call backs need to be added to or deleted from the call back queue 15, top level temporal query queue 16, temporal query queue 17 and evaluation thread index 18 and provides instructions to the index look-up means 21.

The index look-up means 21 adds and deletes call backs, queries and partial evaluation threads as demanded by the temporal query manager 22.

Further, the index look-up means 21 operates on the stored queries and sub-queries and their partial evaluation threads with the events supplied from the event consumer device 20 and identifies those queries, sub-queries and evaluation threads which are fulfilled partially or fully by the events. Advance means 23 then advances the relevant evaluation threads. Where the events result in a partial fulfilment of a sub-query or a further partial fulfilment of the partial evaluation thread new partial evaluation threads are generated by the advance means 23 and placed in the appropriate queues and lists and any new timers are placed in the pending timer queue 13. The existing sub-queries or partial evaluation threads may then be removed or not, depending whether the relevant sub-query is non-spawning or spawning respectively. Where the evaluation threads matched by the received events completely fulfill a temporal query, the advance means 23 places a call-back instruction in the call-back queue 15 so that an appropriate notification can be sent to the relevant user, and the temporal query may be removed.

As timers in the pending timer queue 13 expire, they are automatically transferred to the expired timer queue 14.

As illustrated in FIG. 6, the hierarchy of the data structures within the temporal query engine 10 is that the temporal query system operating within the temporal query engine 10 maintains lists of temporal queries 17. The lists of temporal queries 17 are static and are set up when the queries are submitted. The static lists of temporal queries 17 give rise to dynamic partial evaluation threads 25 which are moved from one partial evaluation state to another when events matching their requirements are received until the partial evaluation threads are fully satisfied. The temporal query system also maintains the static list 26 of event classes which records all of the event classes being received and their parameters, which can be referenced in registered queries.

Although the various elements of the system defined could be provided by dedicated hardware, they will usually be carried out by appropriate software on a computer.

Figure 7A:
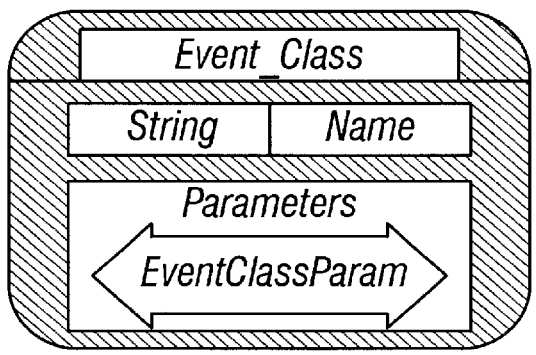
FIG. 7a shows a data structure used to represent event classes in the structure of FIG. 4.

The data structure used to represent event classes is shown in FIG. 7a.

Each event class has a name consisting of a string of characters and a list of parameters. The list of parameters is made up by a list of EventClassParam data structures.

Figure 7B:
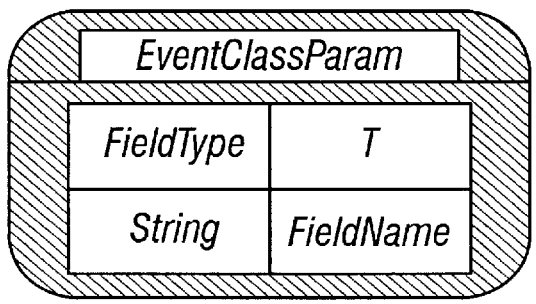
FIG. 7b shows a data structure used to represent the parameters of an event class held in the data structure of FIG. 7.

An EventClassParam data structure is represented graphically in FIG. 7b. The EventClassParam data structure encodes the name and data type of a parameter. The parameters may be of any type supported by the system, for example, string, integer, real, date or boolean type.

Figure 8:
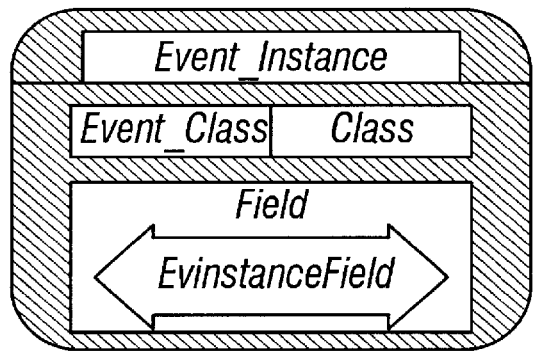
FIG. 8 shows a data structure used to represent an instance of a specific event class held in the data structure of FIG. 7.

Actual events, which can be of any class, are represented by the data structure shown in FIG. 8.

Figure 9:
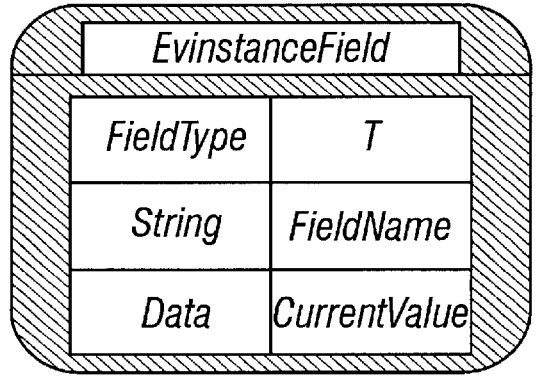
FIG. 9 shows a data structure used to represent the parameters of an event within the data structure of FIG. 8.

Each event is an event instance that has associated with it the name of the class of event to which it belongs. The parameters of the event must also be represented, in this case by a field list containing each parameter. In the field list, each parameter is represented by a data structure EvInstanceField shown in FIG. 9.

The EvInstanceField data structure consists of the field type and name together with a current value. The field type can be any one supported by the system, for example, variable, literal or operator.

Where the event instance represents an incoming event reported to the temporal query engine 10 all of the fields will have actual values.

A similar data structure can be used to provide event templates in which the fields can be variables for wild card matching or comparison values with a comparison operator such as =, > etc.

Every query which is submitted to the system must have associated with it a data structure in order to allow the query to be considered.

Figure 10A:
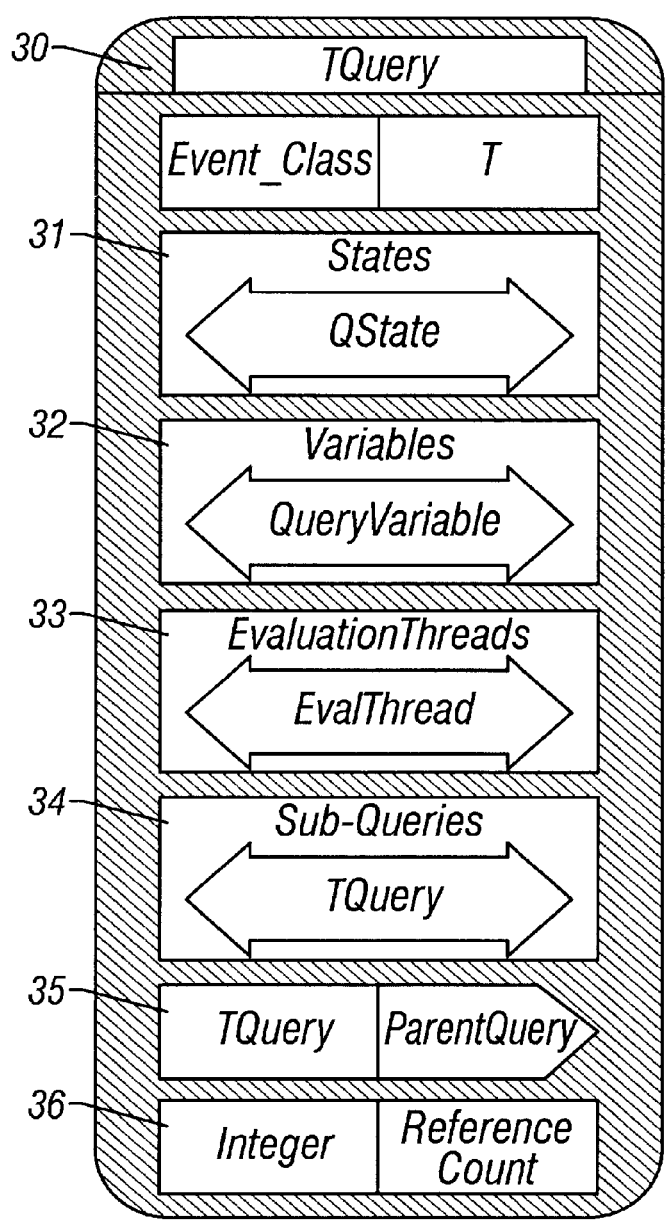
FIG. 10a shows a data structure used to represent a query in the data structure of FIG. 4.

The data structure associated with each query is TQuery as shown in FIG. 10a.

TQuery 30 is a static structure which is created when a query is submitted and registered and is only destroyed when the query is de-registered, either on a user instruction or when the query has been evaluated.

The evaluation of a query may cause sub-queries to be formed which enable evaluation of parts of the overall query and each of these sub-queries will also have the TQuery structure.

The TQuery structure contains the name of the event class created by the temporal query itself, in the example T. The temporal query is defined as creating an event class so that the temporal query can be used as an event class in other temporal queries. This is necessary because, as explained above, the TQuery structures is used for user registered temporal queries and sub-queries.

TQuery 30 contains a list of states 31 that the query may enter. It also holds a list of variables 32 that the evaluation of the query will require.

TQuery 30 also holds a list of evaluation threads 33. This lists the partial evaluation threads that have been derived from the query and are currently active and processing the query. TQuery also contains a list of sub-queries 34 which holds a listing of any sub-queries generated by the query. The listed sub-queries will themselves be data structures of the type TQuery.

TQuery 30 may also hold a reference 35 to the parent of the query if TQuery 30 is itself a sub-query. If TQuery 30 is not a sub-query no parent query will be identified.

Finally, TQuery 30 contains a reference count field which stores as an integer the number of parent queries, if any, which are interested in the query or sub-query represented by TQuery 30.

If TQuery 30 is itself a top level query, that is an actual query registered by a client, the reference count will always be one or more because TQuery 30 will in this case be a parent query interested in itself. The reference count could be more than one because it is possible that as well as being a top level query TQuery 30 could also be a sub-query of other queries.

If TQuery 30 is a sub-query, the reference count records how many parent threads are currently in the state for which the sub-query TQuery 30 is relevant. If this reference count falls to zero, then all evaluation threads for this particular TQuery are killed. If the count then rises above zero, a thread must be created in a start state.

That is, if a number of user registered queries are or incorporate the same query or sub-query, the query or sub-query is only held in the system once and all of the higher level queries or sub-queries incorporating it are identified. This improves the efficiency of the system by reducing duplication.

The list of variables 32 is made up of data structures QueryVariable as shown in FIG. 10a.

The QueryVariable data structure represents a single variable and identifies the name and type of the variable.

The list of states 31 of each TQuery structure 30 contains a list of states 31 that the query may enter. Each of the states the query may enter is defined by a query state structure Q state 37 which contains information relevant to the temporal query.

Figure 11:
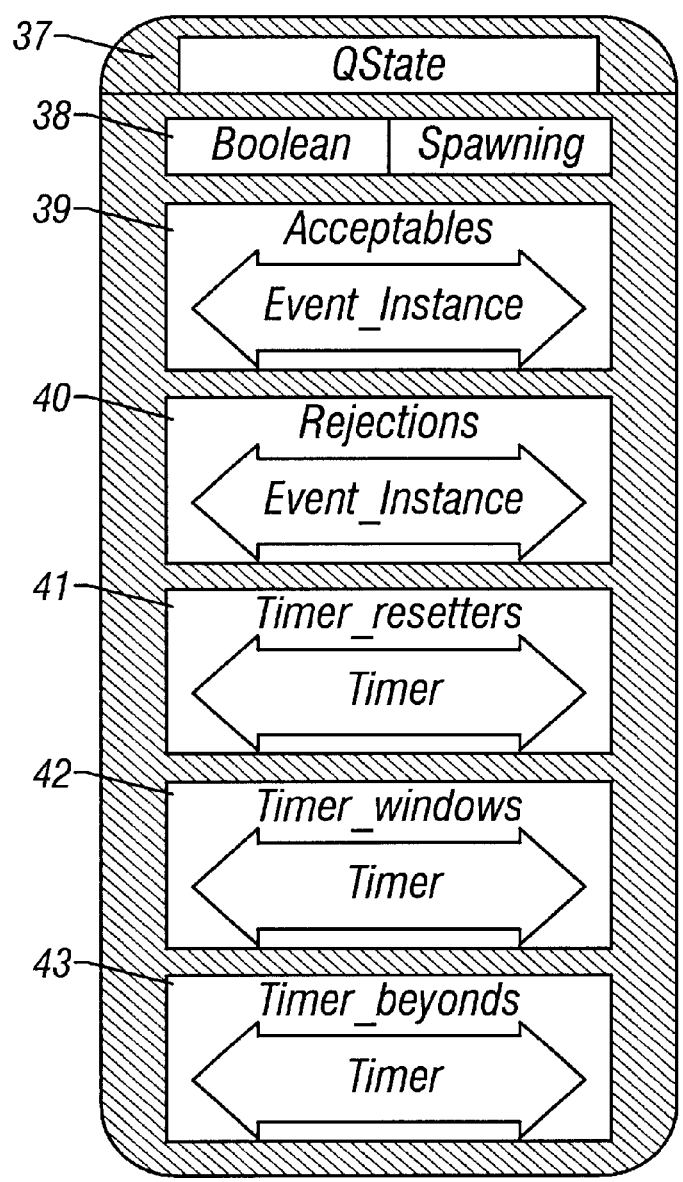

The Q state 37 structure is shown in FIG. 11. Each Q state 37 statically represents one part of a partial evaluation, that is, one state of a query. Firstly, the Q state 37 contains a Boolean spawning status identifier 38 which tells the system whether the state is spawning or non-spawning. As explained above, if the state is spawning, this means that many partial evaluations can exist in this state at one time. If a state is non-spawning, a maximum of one partial evaluation may exist.

Q state 37 contains a list of acceptables 39 which is a list of event instances. Each of the event instances in the list of acceptables has the event instance format shown in FIG. 8 and identifies events for which the system is looking. If an event corresponding to an event instance listed in the acceptables list is identified by the system, the partial evaluation presented by the Q state 37 accepts successfully and the next Q state is entered. A rejections list 40 similarly comprises a list of event instances but will cause the evaluation to reject. If an event instance contained in the rejections list is identified by the system, the partial evaluation represented by the Q state is terminated.

Finally, the Q state 37 structure comprises three timer lists, a timer re-setter list 41, timer windows list 42 and timer beyond list 43.

The timer lists are required because when a query enters the state represented by the Q state 37 data structure, there may be some time limits on the evaluation of particular events.

There are three basic types of these time limits and these are stored in the three timer lists 41, 42 and 43, respectively. The three types of timers are as follows:

The first type of timer are Resetter timers. If the relevant event occurs while the timer is running, the timer is reset and the Q state 37 remains in its current state. If the timer reaches its limit without the relevant event occurring, the Q state 37 enters the next Q state. Resetter timers are held in the timer resetters list 41.

The second type of timer are windows timers. If the relevant event occurs while the timer is running, the Q state 37 moves to the next Q state. However, if the timer expires without the event occurring, the event is no longer relevant and the evaluation rejects so that the partial evaluation represented by the Q state 37 is terminated. Windows timers are held in the timer windows list 42.

The third type of timer are beyond timers. If the relevant event occurs before the timer expires, the evaluation rejects and the partial evaluation represented by the Q state 37 is terminated. If the timer expires without the relevant event occurring, the Q state 37 accepts successfully and the next Q state is entered. Beyond timers are stored in the timer beyonds list 43.

It is preferred and simplest to have three separate timer lists for the three separate types of timer. However, it would be possible to have all of the currently running timers for a Q state 37 held in a single list and have the timers themselves identify the type of action to be taken when they expire.

In this application, expiry of a timer is referred to. In practice, timers can be set to count down to zero or up or down to a particular value as convenient.

In order to allow temporal queries to be supported by the system, it is necessary that the Q state structure 37 contains a timer list or lists such as timer lists 41 to 43. However, since some queries and sub-queries will not be temporal queries, that is, will not be based on the time related criteria, some Q states will not have any timers held in some or any of these lists. It should be noted that the requirement for the sub-query events to take place in a particular sequence within a query is automatically catered for by the structure of partial evaluation threads because the partial evaluation threads relating to subsequent events in a query do not exist until they have been generated in response to identification of all of the previous events in the query. Accordingly, the timers are only required to handle temporal queries specifying time limits or periods and not to deal with sequence of events.

Figure 12:
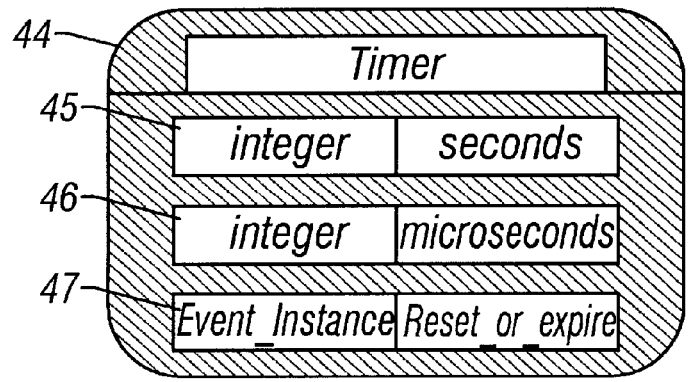
FIG. 12 shows a timer data structure forming a part of the data structure of FIG. 11.

In FIG. 12, the timer structure 44 is shown. The timer structure 44 is used to encode any of the timers found in any of the three lists 41 to 43.

The timer structure contains integer values 45 and 46 for the number of seconds and microseconds respectively before the timer activities. The timer structure 44 also includes an event instance identifier 47 which specifies whether activation of the timer causes the Q state to which it is attached to be reset or expire.

When the timer 44 is first brought into existence, it immediately begins counting towards the integer value in seconds and microseconds contained in the timer. It will be realized that the value may be set in microseconds only or any other time values such as milliseconds or seconds only if desired, but it has been found convenient to count in microseconds and seconds in practice.

When the said time value is reached, the timer activates. When the timer activates, if the reset or expire identifier 47 is set to reset, the timer causes its parent Q state to be terminated similarly to the identification of a rejection event. This corresponds to a sub-query specifying that an event should occur by a particular time or within a time period after another event.

If the timer is identified as expire, activation of the timer causes the parent Q state to accept successfully and move on to the next Q state similarly to identification of an event instance being looked for by the Q state. This corresponds to a sub-query in which it is specified that an event should not occur before a particular time or within a time limit after another event.

Figure 13:
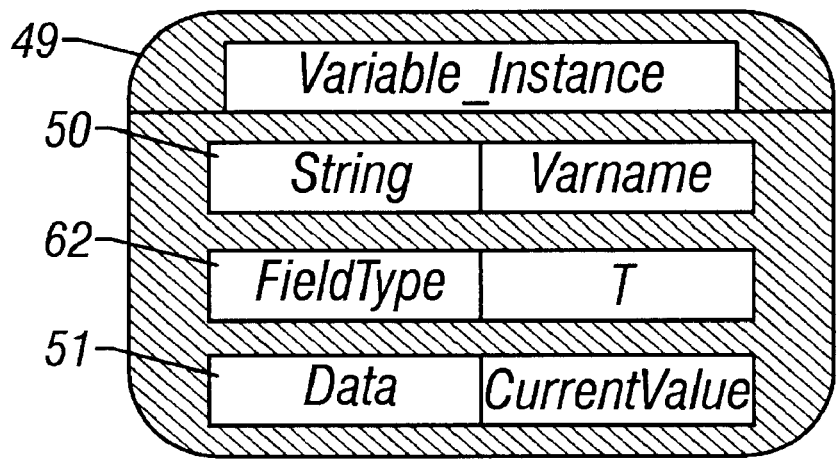

As noted above, events may refer to parameters of the event which may be variable. The simple data structure used to represent the variables is shown in FIG. 13. The variable structure 49 simply holds the variable name 50, the variable data type 62 and the variable value 51. The variable name will always be of the data type string. The variable data type identifies the data type of the variable and the variable value is the current value. The variable can be any data type such as integer, real, string or date, for example.

One example of a variable which would be the string data type would be a stock name, which would have the name stock name, the type string and a value of the stock name.

Figure 10B:
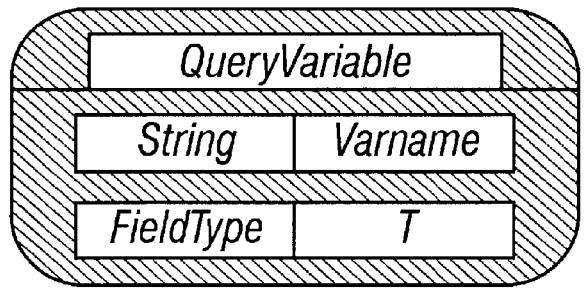
Figure 14:
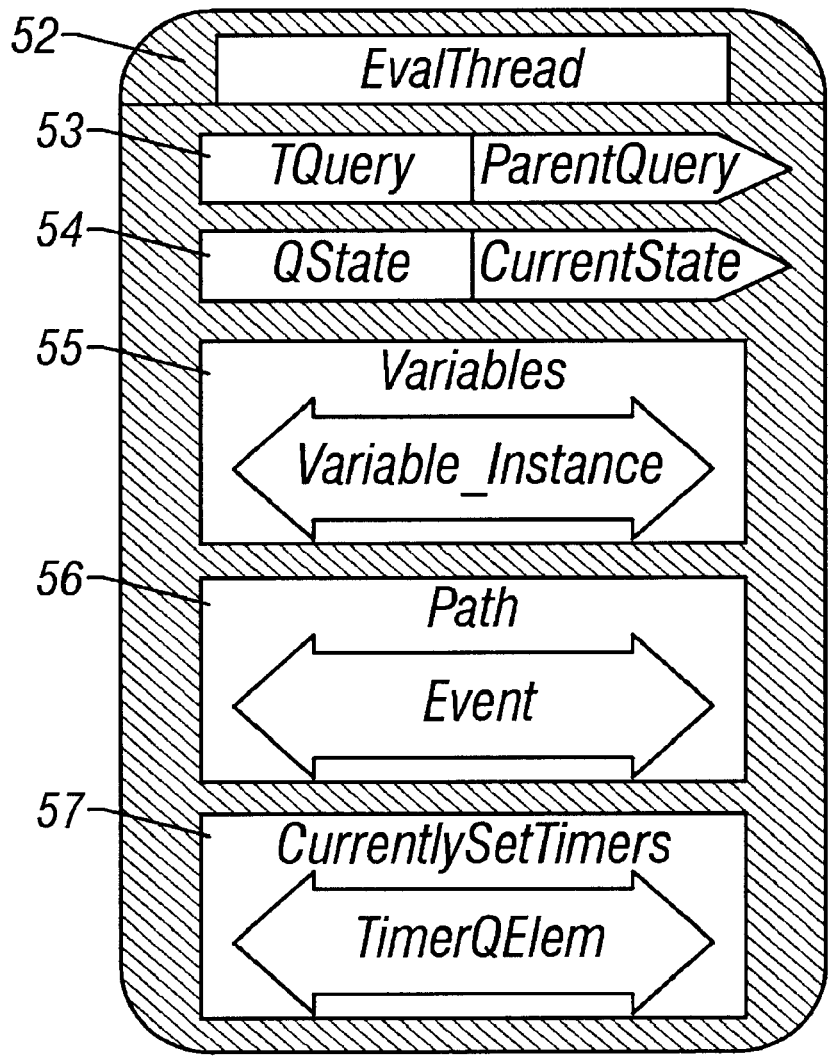
FIG. 14 shows a data structure representing a partial evaluation for use in the data structure of FIG. 4.

Partial evaluation threads are represented by the structure Evalthread 52 shown in FIG. 14. This structure Evalthread holds a reference 53 to its parent query. This parent query is a query having a TQuery structure shown in FIG. 10 and may itself be a sub-query of further queries or sub-queries.

The Evalthread 52 also contains a reference 54 to a QState structure which holds information about the current state of the partial evaluation thread.

The Evalthread structure 52 further includes a variables list 55 listing variables which have been instantiated, that is captured from reported events or other sub-queries, during evaluation and a path list 56 which contains a record of the evaluation path leading to the partial evaluation thread structure 52. That is, a record of the events which have been processed so far to arrive at the current status of the partial evaluation thread.

Figure 15:
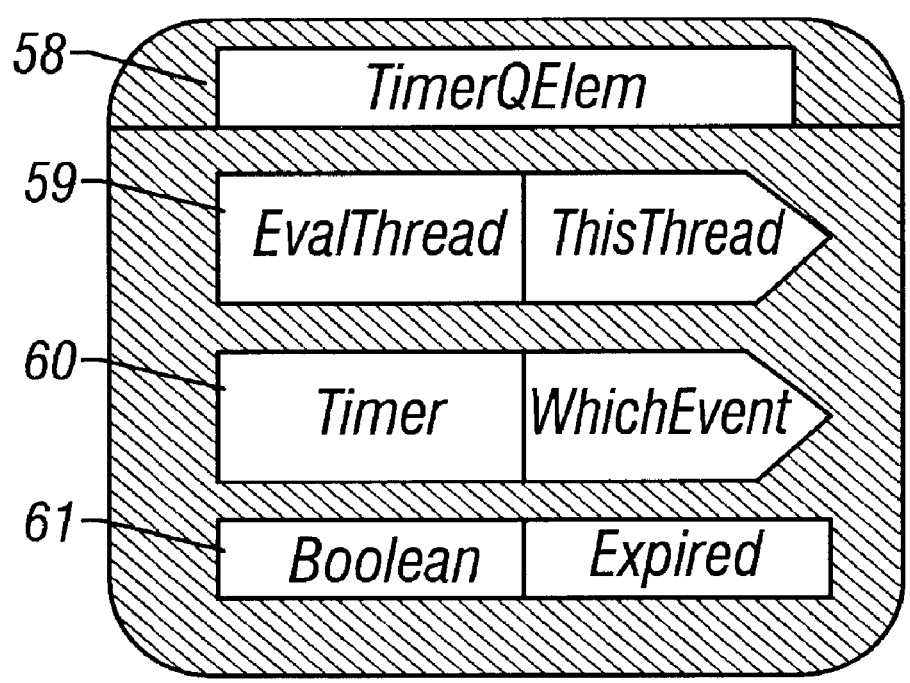
FIG. 15 shows a timer listing data structure forming a part of the data structure of FIG. 14.

Finally, the Evalthread structure 52 contains a currently set timer list 57 which lists timers relevant to the partial evaluation thread which is currently active. The currently set timers list 57 contains TimerQElem structures which are shown in FIG. 15.

The TimerQElem structure 58 holds an active timer for a particular evaluation thread 52. The TimerQElem 58 includes a reference 59 to the evaluation thread for which the timer is operating and a reference 60 to how long the timer should last and the event instance starting the timer. Lastly, an indicator 61 indicates whether the timer has expired yet or not.

When the timer is created, the TimerQElem 58 is placed in the current set timers queue for the evaluation thread. Where multiple timers are operating, the TimerQElem elements 58 are placed in time order.

As discussed above, a commonly preferred method of notification is by e-mail. Other methods of notification could be used including normal mail, voicemail, notification to a mobile telephone or pager, notification by facsimile or the sending of notifications to a web page.

As discussed above, the invention is applicable to any field in which events are to be matched or queried, but it is expected that the following fields will be particularly useful.

Financial analysis, for example, detecting when a positive news article in a business sector is followed by a corresponding rise in stock price. This information is used rapidly to allow traders to act on it. Events here include stockprice changes and news reports.

Gambling analysis tools, for example, detecting when the odds in a horserace change following publication of a news article on the race. Events here include odds changes and news reports.

Location and context awareness systems, where the events include the locations of physical objects. Such physical objects may be electronically tagged persons, animals or vehicles. For example, where persons in a building have electronic tags, it is possible to react to events such as when two particular persons are together.

Similarly, if persons or vehicles are tagged, they could be sent information regarding events relevant to their location such as the availability of parking spaces.

Supply chain management, for example, stock of weather dependent goods such as rain wear or salad, the events would be stock levels and weather.

Logistics, events here would include transport slot availability and price.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of evaluating queries against received event information and generating notification that events specified in the queries have occurred, comprising:

recording a number of queries, each of which comprises a plurality of sub-queries each requiring a different item of event information to be matched;

receiving a plurality of items of event information;

comparing the received items of event information with the sub-gueries; and generating a notification if the item of event information matches all the sub-queries comprising the query.

2. The method of claim 1, wherein a series of items of event information are received and are compared sequentially with the queries.

3. The method of claim 1, wherein each one of the queries can specify a boolean logical relationship between the items of event information.

4. The method of claim 1, wherein each one of the queries can specify a temporal relationship between the items of event information.

5. The method of claim 4, wherein each one of the queries can specify the sequence of items of event information.

6. The method of claim 4, wherein each one of the queries can specify that an item of event information must occur in a set time period after another item of event information.

7. The method of claim 4, wherein each one of the queries can specify that items of event information must occur in a particular sequence without the intervening occurrence of another item of event information.

8. The method of claim 1, wherein each one of the queries can specify that an item of event information must not occur in a set time period after another item of event information.

9. The method of claim 8, wherein each one of the queries can specify that items of event information must occur in a particular sequence without the intervening occurrence of another item of event information.

10. The method of claim 1, wherein at least one of the queries can specify that a variable be taken from one item of event information by one sub-query and be used as a criteria for comparing further items of event information with a subsequent sub-query.

11. The method of claim 10, wherein at least one of the queries can specify that the criteria used for comparing further items of event information with said subsequent sub-query is that the further items of event information include variables having a specified relationship with said variable taken from said one item of event information by said one sub-query.

12. The method of claim 1, wherein at least one of the queries can specify a plurality of options and the matching of any one of the options is regarded as matching the query.

13. The method of claim 1, wherein a sub-query can specify that an item of event information occurs or does not occur in a set time period after a previous sub-query is matched.

14. The method of claim 1, wherein a sub-query can be set to be non-spawning, wherein only a first occurrence of a specified event is used to progress to a subsequent sub-query, or spawning, wherein case each occurrence of a specified event is used to progress to a subsequent sub-query and the resulting multiple progressions to the subsequent sub-query are separately evaluated.

15. The method of claim 1 or claim 2, wherein the events comprise stock price changes and news events; gambling odds and related news items; product inventories and weather; or prices and availability of goods and services.

16. The method of claim 1 or claim 2, wherein the events include location information for physical objects.

17. The method of claim 16, wherein the physical objects comprise electronically tagged persons, animals or vehicles.

18. The method of claim 17 wherein the events also include information relevant to the current location of the object.

19. The method of claim 1 or claim 2, wherein generated notifications are sent by electronic-mail, mobile telephone, pager, facsimile, voicemail, or postal mail.

20. A method according to any one of claims 1 or claim 2, wherein the generated notifications are sent to a web page.

21. A computing device programmed to perform a method of evaluating queries against received event information and generating notification that events specified in the queries have occurred, comprising:
  recording a number of queries, each of which comprises a plurality of sub-queries each requiring a different item of event information to be matched;
  receiving a plurality of items of event information;
  comparing the received items of event information with the sub-queries; and
  generating a notification if the item of event information matches all the sub-queries comprising the query.

22. The computing device of claim 21, wherein a series of items of event information are received and are compared sequentially with the queries.

23. A program storage device encoded with instructions that, when executed by a computing device, perform a method of evaluating queries against received event information and generating notification that events specified in the queries have occurred, comprising:
  recording a number of queries, each of which comprises a plurality of sub-queries each requiring a different item of event information to be matched;
  receiving a plurality of items of event information;
  comparing the received items of event information with the sub-queries; and
  generating a notification if the item of event information matches all the sub-queries comprising the query.

24. The program storage device of claim 23, wherein a series of items of event information are received and are compared sequentially with the queries.

* * * * *